United States Patent [19]

La Plante

[11] Patent Number: 4,671,438
[45] Date of Patent: Jun. 9, 1987

[54] ATTACHMENT SYSTEM FOR MOUNTING A PANNIER ON A BICYCLE CARRIER RACK

[75] Inventor: Mark T. La Plante, Ridgefield, Conn.

[73] Assignee: Cannondale Corporation, Georgetown, Conn.

[21] Appl. No.: 831,361

[22] Filed: Feb. 20, 1986

[51] Int. Cl.$^4$ .............................................. B62J 7/00
[52] U.S. Cl. .................................... 224/32 A; 224/39
[58] Field of Search ................ 224/30 R, 32 R, 32 A, 224/39

[56]  References Cited

U.S. PATENT DOCUMENTS 4,577,786  3/1986  Dowrick et al. ................. 224/32 A Primary Examiner—Stephen Marcus
Assistant Examiner—David Voorhees
Attorney, Agent, or Firm—Brumbaugh, Graves, Donohue & Raymond

[57]  ABSTRACT

An attachment system for mounting a pannier on a bicycle carrier rack, the pannier being of a type having a substantially rigid back frame component providing two attachment points in the upper portion thereof and the rack being of a type having two longitudinally spaced-apart upper mounting points, comprises first and second hooks fastened to the respective attachment points of the pannier back frame component and adapted to be hooked over the respective two upper mounting points on the rack. An over-center lever is attached to the pannier back frame to pivot about a pivot axis substantially perpendicular to the back frame and includes a first surface thereon engageable with the underside of a rack member in a locked position of the lever, said surface being spaced apart from the pivot axis a distance slightly greater than a line of shortest distance between said rack member and the pivot axis, whereby the locked position of the lever is over center with respect to said shortest distance line. The lever further includes a second surface engageable with either a portion of the pannier back frame or the upper surface of a rack member when the lever is in the locked position and prevents the lever from moving beyond the over-center locked position in a direction away from the shortest distance line.

8 Claims, 3 Drawing Figures

ATTACHMENT SYSTEM FOR MOUNTING A PANNIER ON A BICYCLE CARRIER RACK

BACKGROUND OF THE INVENTION

In recent years bicycling has become a very popular recreational and physical-conditioning activity. For one form of recreational bicycling, bicycle touring, it is desirable to equip the bicycle with a rear carrier rack or front carrier rack or both and to attach panniers to the racks to carry clothing, food, camping equipment and the like. Along with the increasing popularity of bicycle touring has come the development of a variety of rack and pannier systems.

It has long been recognized that an important objective in designing a bicycle bag is to enable the rider to carry equipment in such a way as to minimize movement of the equipment relative to the bicycle, inasmuch as shifting of loads carried on the bicycle relative to the bicycle produces undesirable swaying motions that significantly increase the effort of a rider required to control the bicycle, mainly in the form of considerable attention to steering to maintain balance and tracking. In the case of rear panniers, for example, swaying of the panniers relative to the rearward portion of the bicycle creates an effect known as tail wagging, which the rider has to compensate for by a combination of steering and body movements to maintain balance.

An important development in panniers was made by the assignee of the present invention and is the subject matter of U.S. Pat. No. 4,271,996. According to that development, a pannier frame system is provided in which a bag of flexible, durable material is given shape and load-carrying capability by a three-dimensional internal frame comprising a back member and a top member, the top member being joined to the back member in such a way as to provide load-carrying support for the fabric bag from the top member. As part of the pannier system of the aforementioned patent, an attachment system is included which comprises a pair of hooks fastened to the upper portion of the pannier frame and adapted to be hooked over the top of the longitudinal top bars along each side of a rear carrier rack. One end of a tension spring is connected to the back part of the internal frame of the pannier at a point well up the back of the bag, and the other end of the spring is connected to a J-hook or the like fastened to a lug on the rear dropout of the bicycle frame. The lower portion of the spring is held against the back of the pannier frame by an external strap. When the pannier is mounted on the rear rack, the spring force holds the pannier down on the rack to prevent the hooks from releasing from the top bar. The engagement of the lower portion of the spring by the strap restrains the lower portion of the bag from swaying out laterally. The pannier system of U.S. Pat. No. 4,271,966 has been very successful in the marketplace and under most circumstances provides excellent restraint against the swaying of the panniers. Moreover, it is very convenient to use, in that to detach the pannier from the rack the user need only lift up on the pannier with sufficient force to overcome the force of the tension spring, thereby dislodging the upper hooks from the top bar of the rack. The user then lowers the pannier to relax the spring and allow the spring to release from the inverted J-hook at the bottom.

There are, nonetheless, shortcomings in the attachment system described above. For one thing it is desirable to provide a fairly substantial spring force to hold the bag down on the rack. This means that it is sometimes necessary for the user to hold the rear part of the bicycle down with one hand and lift the pannier with the other to place the hooks over the rack. Moreover, the user has to apply a fairly large force to detach the pannier and, for that matter, to attach it to the rack. Another problem is that because the spring force is, of course, limited and can be overcome, it is possible for the pannier to be detached from the rack by an abrupt upward force, such as can result from going over a sharp bump in the road.

Hine-Snowbridge, Inc. of Boulder, Colo., which markets several lines of bicycle products under the name Kirkland, has recently introduced commercially a pannier suspension system under the designation "Leverlock". The Leverlock system comprises a pair of spaced-apart inverted J-hooks mounted adjacent the top of a pannier, a pair of lower hooks tensioned by elastic cord for attachment to the lower portions of the struts of the rear carrier rack, and a large plastic lever pivotably connected at approximately its mid-point to a pivot axis on the pannier back frame. A triangular lock plate is also attached to the pivot axis and is arranged to be adjusted to a desired position rotationally with respect to the pivot axis through an angle defined by an arcuate slot that receives a lock screw associated with the pannier frame. The lock plate has a projecting lug that captures one end of the lever in a locked position in which a locking surface at the other end is engaged under the underside of the side rail of the carrier rack platform. The adjustable locking plate allows the user to change the angle of attack between the lever and the top bar, thereby effectively changing the distance between the pivot axis of the lever and the bar of the rack. Releasing and engaging the lever requires the user to push laterally inward on the lever toward the wheel to clear the locking lug on the lock plate. While the Leverlock system is reasonably effective in retaining the pannier on the rear rack against dislodgement caused by abrupt upward forces, the components are of very large size, which makes them somewhat of a nuisance when the panniers are handled off the rack. When in position on the rack, the user has to fish down in a tight area between the wheel and the pannier well below the top of the rack to manipulate the lever to lock or unlock it.

SUMMARY OF THE INVENTION

There is provided, in accordance with the present invention, an attachment system for mounting a pannier on a bicycle carrier rack that is of very simple construction, small in size and weight, and very easy to use. The attachment system is designed for use with panniers of a type that have a substantially rigid back frame component that provides two attachment points in the upper portion and with a rack that has two longitudinally spaced-apart upper mounting points. Ordinarily, the two upper mounting points of the rack will be points along a horizontal upper side bar of the rack. The attachment system can be used with both front and rear over-the-wheel racks and with so-called low rider front racks.

In particular an attachment system in accordance with the present invention comprises first and second hooks fastened to the respective attachment points of the pannier back frame component and adapted to be hooked over the respective two upper mounting points on the rack. An over-center lever is attached to the pannier back frame to pivot about a pivot axis located below the attachment points and oriented substantially perpendicular to the back frame component. A first surface on the over-center lever is engageable with the underside of a rack member in a locked position of the lever, that surface being spaced-apart from the pivot axis a distance slightly greater than the length of a line of shortest distance between the rack member and the pivot axis. Accordingly, the locked position of the lever is "over-center" with respect to the shortest distance line. The lever includes a second surface engageable with either a portion of the pannier back frame or the upper surface of a rack member when the lever is in the locked position such that the lever is prevented from moving farther beyond the locked position in a direction away from the shortest distance line.

In a preferred embodiment of the invention, the attachment system involves upper mounting points on the rack that are along a substantially horizontal top bar of the rack and the first surface on the over-center lever engages the underside of the top bar at a location intermediate the upper mounting points. Advantageously, the first surface of the lever is a surface of a roller that is rotatably mounted on the lever so that pivoting of the lever between the locked and unlocked positions is facilitated by rotation of the roller as the lever pivots with the roller engaged with the undersurface of the rack member in the region of the shortest distance line.

In a preferred embodiment the lever is generally L-shaped and is pivotably connected to the pannier frame at the free end of one leg. The first surface is located proximate to the juncture between the two legs. The second surface is adjacent the free end of the other leg. In a preferred embodiment, the second surface is the underside of a tab that extends laterally from the second leg for engagement with either the pannier frame or the top bar of the rack.

As a further optional, but desirable, characteristic of the present invention, a third hook is fastened to the pannier back frame near the bottom of the pannier and is adapted to be hooked over a third mounting point on the rack, thereby to provide a third attachment point between the pannier and the rack. In such an embodiment the lower portion of the pannier is rigidly, as distinguished from elastically, attached to the carrier rack against lateral movement. A fourth hook may be fastened to the pannier back frame near the bottom and spaced apart from the third hook to provide a fourth attachment point between the pannier and the rack. Such a four-point attachment system distributes the downward vertical load transfers and side load transfers between the pannier and the rack among four points, such that the pannier back frame and the rack function conjointly to support objects in the pannier against downward and lateral movement. Meanwhile the over-center lever prevents upward movement of the pannier on the rack, thereby keeping all of the four attachment points operational at all times.

For a better understanding of the invention reference may be made to the following description of an exemplary embodiment, taken in conjunction with figures of the accompanying drawings.

DESCRIPTION OF THE EMBODIMENT

Figure 1:
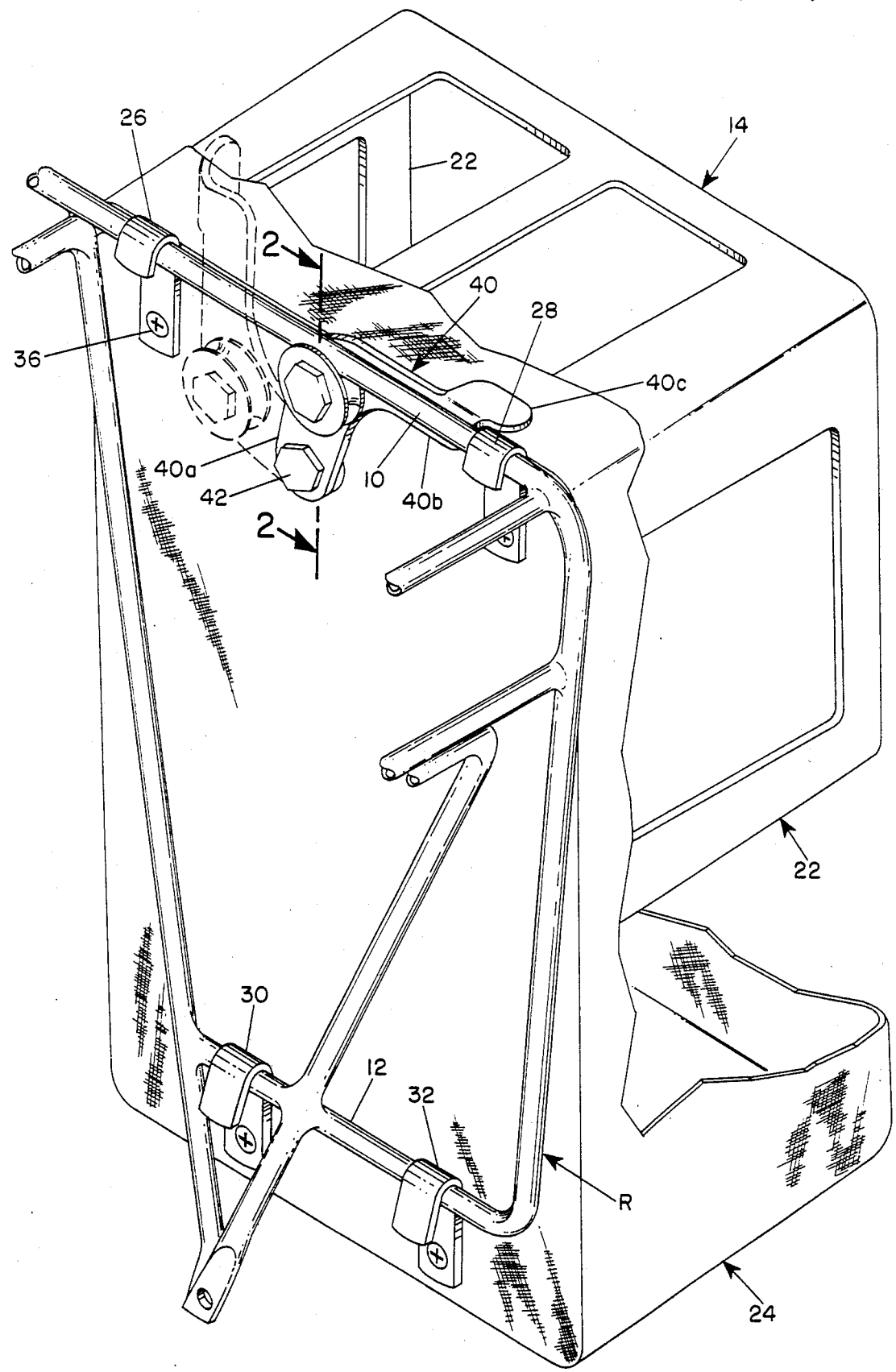
FIG. 1 is a three-quarter pictorial view of the embodiment taken from above, behind and to the rear of the back wall of a pannier equipped with an attachment system embodying the present invention.

As an non-limiting example of an application of the present invention, the embodiment is shown in the drawings as used with a rear carrier rack R that has been recently introduced commercially by the assignee of the present invention, Cannondale Corporation of Georgetown, Conn. In addition the rack is fully described and shown in U.S. patent application Ser. No. 822,772, filed Jan. 24, 1986 and entitled "Bicycle Rear Carrier Rack". For purposes of describing the embodiment, it is sufficient to observe that the rear carrier rack R shown in FIG. 1 comprises a generally horizontal top side bar 10 forming part of a top platform of the rack and a lower substantially horizontal bar 12 forming part of the supporting strut structure of the rack. The rack shown in the drawings is, of course, merely representative of a variety of carrier racks, including both front and rear racks having platforms located above the wheels and of the front low rider racks that are attached to the front forks of a bicycle. The invention is applicable to a wide variety of bicycle carrier racks. In some instances the present invention may need to embody a specific design as to dimensions and locations of the attachment hooks and the over-center lever in order that the attachment system will fit a particular brand and model of carrier rack.

In a similar manner, FIG. 1 of the drawings illustrates the embodiment of the attachment system of the present invention to a pannier that is constructed in a manner that is known per se, several styles of which have been marketed for some years by Cannondale Corporation. A noteworthy component of those panniers is a three-dimensional, substantially rigid internal frame 14 that includes a back portion 16 (see FIGS. 2 and 3) and a top portion 18. The back and top portions are connected along a top juncture 20. Side portions 22 located adjacent the upper ends of the forward and rearward end walls of the pannier support the top portion from the back portion and enable the fabric bag to hold its shape when loaded. The back, side and top portions of the three-dimensional frame 14 are formed by networks of interconnected ribs. The back portion 16 is bounded by a peripheral rib (not shown) that is substantially coextensive with the perimeter of the back wall of the fabric bag 24, only a portion of which is shown in FIG. 1. Likewise the top portion 18 of the frame includes a peripheral rib that is coextensive with the perimeter of the top wall of the fabric bag 24. The frame imparts shape and stability to the fabric bag, and the top portion has load-supporting capability so that the pannier top serves as a lateral extension of the carrier rack platform (in the case of over-wheel racks). For a full description of a pannier suitable for use with the present invention, reference may be made to U.S. Pat. No. 4,271,996 issued June 9, 1981.

To reiterate, the frame 14 is merely exemplary of a type of frame that lends itself to application of the present invention. More generally, the present invention is useful in any form of pannier having a back frame component that provides two longitudinally spaced apart attachment points adjacent the upper portion of the back wall of the pannier for mounting the pannier on a carrier rack that has two correspondingly located mounting points.

Figure 2:
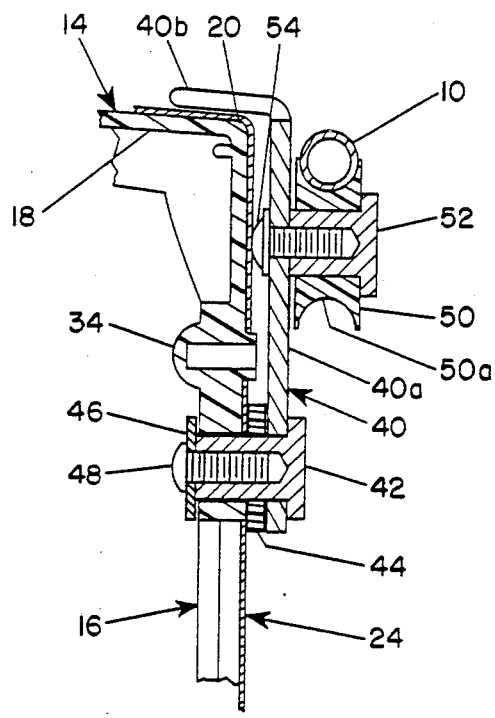
FIG. 2 is a detailed end cross-sectional view of the over-center lever of the embodiment of FIG. 1 taken generally along the plane represented by the lines 2—2 in FIGS. 1 and 3 and in the direction of the arrows.

In the embodiment, the network of interconnected ribs of the back frame portion 16 of the pannier frame 14 is suitably configured in the manner fully described and shown in U.S. Pat. No. 4,271,996, which is hereby incorporated herein by this reference, to provide two upper attachment points for attaching inverted upper J-hooks 26 and 28 and two lower attachment points for connecting two inverted lower J-hooks 30 and 32. Referring briefly to FIG. 2, one suitable form of attachment is to mold into the frame rib network bosses 34 for receiving self-tapping screws (e.g. 36, in FIG. 1). The upper hooks 26 and 28 are located on the pannier frame to be hooked over the platform side bar 10 of the rack. The lower hooks 30 and 32 are positioned to be received on mounting points spaced lengthwise from each other on the lower horizontal bar 12 of the rack.

It is apparent just from looking at FIG. 1 that the arrangement of hooks is such that the pannier is essentially rigidly attached to the rack at four mutually spaced-apart attachment points, these points being generally proximate to each corner of the pannier. Inasmuch as the four attachment points are interconnected by way of the back component 16 of the internal frame (see U.S. Pat. No. 4,271,996), the four attachment points provide for load-sharing among them to support vertical loads of objects carried in the pannier and also to rigidly join the frame of the pannier directly to the rack. In this way the structure of the rack is integrated into the structure of the internal frame so that the rack and frame act together in carrying the loads of the pannier; it can truly be said that the pannier becomes part of the rack. The four attachment points provided by the hooks 26, 28, 30 and 32 support side loads at locations generally adjacent the four corners of the pannier, thereby virtually eliminating all side-to-side swaying motion of the pannier relative to the rack.

The four J-hooks are maintained firmly seated in operative position on the carrier rack bars 10 and 12 by an over-center lever 40 that is pivotably attached to the back component 16 of the pannier frame by a sleeve nut 42, nylon washer 44, a steel washer 46 and a screw 48. The pivot axis of the lever 40 is located a short distance below the top bar and intermediate the upper J-hooks 26 and 28, and is perpendicular to the back component 16 of the internal frame. The lever 40 is generally L-shaped, comprising a pair of angularly related legs 40a and 40b. Rotatably mounted above the pivot axis of the lever 40 in a position near the juncture between the legs is a plastic roller 50. The circumferential surface 50a of the roller 50 is concave to match generally the cross-section of the bar 10 of the rack. The roller 50 rotates about a sleeve nut 52 fastened to the leg 40a to the lever 40 by a button head cap screw 54.

Figure 3:
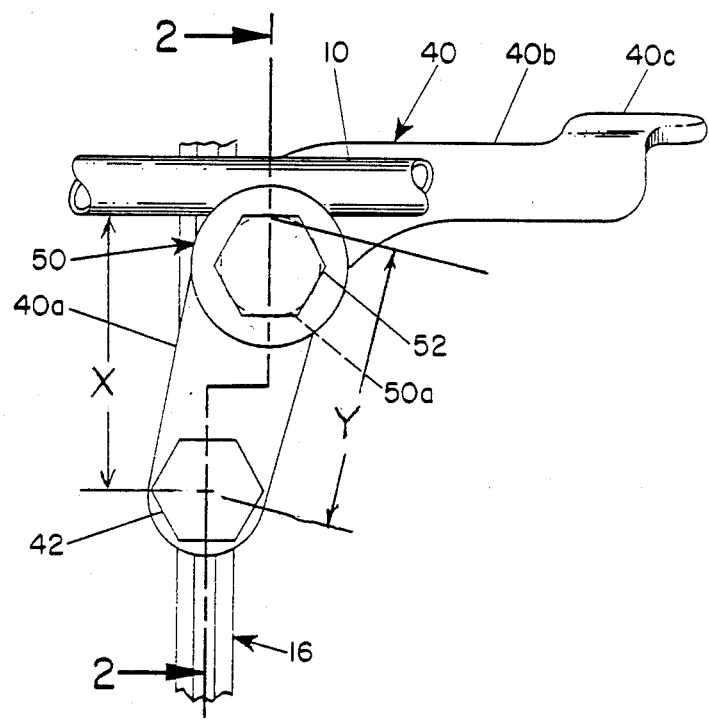
FIG. 3 is a fragmentary detail elevational view of the over-center lever.

Referring to FIG. 3, the line of shortest distance X between the pivot axis of the lever 40 and the undersurface of the rack top rail 10 is, of course, a line that is perpendicular to the top rail 10 and passes through the center axis of the sleeve nut 42. The lever assembly is constructed so that the distance Y between the center axis of the sleeve nut 42 and the minimum diameter of the concave surface 50a of the roller 50 is slightly greater than the dimension of the shortest distance line.

At the free end of the leg 40b of the lever 40 is laterally extending flange or tab 40c. The tab 40c is located such that when the lever is in a locked condition, as shown in solid lines in FIGS. 1 and 3, it engages the top of the pannier at the juncture 20 between the upper edge of the back component 16 and the back edge of the top component 18 of the pannier frame. In the position of such engagement the tab 40c holds the roller 50 in a position over-center, relative to the shortest distance line, with respect to the release position shown in dotted lines in FIG. 1. Movement of the over-center lever 40 between the latched and unlatched positions is accommodated by deformation and deflection of various elements of the system that are subject to the forces as the lever moves through the region of the shortest distance line, including compressability of the roller 50, deflection of the bar 10 of the rack and flexure of the back component 16 of the frame in the region of the pivot axis. Likewise, the force due to the resiliency of the various elements retains the overcenter lever in the latched position. In addition to maintaining the latched position of the over-center lever, i.e., preventing the lever from pivoting in a direction away from the shortest distance line beyond the locked position (clockwise), the tab 40c provides a convenient element of the lever for grasping to move the lever between the latched and unlatched positions.

It will be observed in FIG. 1 that the length of the retaining legs of the lower J-hooks 30 and 32 are longer than those of the upper hooks 26 and 28. Hence, positioning of the pannier on the rack is easier, because the lower hooks can be seated first and then the pannier can be lifted slightly up just to clear the lower edges of the upper hooks over the rack bar 10; meanwhile the lower hooks stay partially in place. Moreover, the pannier is easy to lock in position, in as much as the over-center lever is conveniently accessible from above the pannier and to the side of the rack. The lug 40c prevents the lever from falling all the way down behind the bag into an inaccessible position when the pannier is not on the rack.

I claim:

1. An attachment system for mounting a pannier on a bicycle carrier rack, the pannier being of a type having a substantially rigid back frame component providing two attachment points in the upper portin thereof and the rack being of a type having two longitudinally spaced-apart upper mounting points, comprising first and second hooks fastened to the respective attachment points of the pannier back frame component and adapted to be hooked over the respective two upper mounting points on the rack, and an over-center lever attached to the pannier back frame to pivot about a pivot axis substantially perpendicular to the back frame and located below the said attachment points, the lever having a firs surface thereon engageable with the underside of a rack member in a locked position of the lever, said surface being spaced apart from the pivot axis a distance slightly greater than the length of the line of shortest distance between said rack member and the pivot axis, whereby the locked position of the lever is over center with respect to said shortest distance line, and the lever including a downwardly facing second surface engageable with either an upwardly facing portion of the pannier back frame or an upper surface of a rack member when the lever is in the locked position, whereby the lever is prevented by an upwardly directed force acting on said second surface thereof from moving beyond the locked position in a direction away from the shortest distance line.

2. An attachment system according to claim 1, wherein the upper mounting points of the rack are on a substantially horizontal top bar of the rack, and the first surface on the lever engages the underside of the top bar at a location intermediate the upper mounting points.

3. An attachment system according to claim 1, wherein the first surface of the lever is a surface of a roller rotatably mounted on the lever, whereby pivoting of the lever between the locked and unlocked positions causes rotation of the roller as the lever pivots with the roller engaged with the undersurface of the rack member.

4. An attachment system according to claim 2, wherein the lever is generally L-shaped and includes a first leg pivotably connected at its free end to the pannier back frame component and a second leg, wherein the first surface is located proximate to the junctures between the legs, and wherein the second surface is adjacent the free end of the second leg.

5. An attachment system according to claim 4, wherein the first surface of the lever is a surface of a roller rotatably mounted on the lever, whereby pivoting of the lever between the locked and unlocked position causes rotation of the roller as the lever pivots with the roller engaged with the undersurface of the rack member.

6. An attachment system according to claim 4, wherein the second surface of the lever is a tab extending laterally from the second leg.

7. An attachment system according to claim 1, and further comprising a third hook fastened to the pannier back frame proximate to the bottom of the pannier and adapted to be hooked over a third mounting point on the rack, thereby to provide a third attachment point between the back frame and the rack.

8. An attachment system according to claim 7, and further comprising a fourth hook fastened to the pannier back frame proximate to the bottom of the pannier and spaced apart from the third hook and adapted to be hooked over a fourth mounting point on the rack and provide a fourth attachment point between the back frame and the rack, whereby the four hooks sustain downward vertical load transfers and side load transfers and unite the pannier back frame to the rack such that the pannier back frame and rack function conjointly to support objects in the pannier and whereby, in addition, the over-center lever prevents upward movement of the pannier on the rack to maintain all hooks seated in operative positions.

* * * * *